United States Patent [19]

Ocvirk et al.

[11] Patent Number: 4,818,038
[45] Date of Patent: Apr. 4, 1989

[54] VEHICULAR BRAKE SYSTEM WITH ELECTRONIC ANTI-LOCK CONTROL AND TRACTION SLIP CONTROL

[75] Inventors: Norbert Ocvirk, Offenbach; Lutz Weise, Mainz; Horst-Peter Becker, Frankfurt am Main; Otto Determann, Darmstadt, all of Fed. Rep. of Germany

[73] Assignee: Alfred Teves GmbH, Frankfurt am Main, Fed. Rep. of Germany

[21] Appl. No.: 73,490

[22] Filed: Jul. 15, 1987

[30] Foreign Application Priority Data

Jul. 23, 1986 [DE] Fed. Rep. of Germany ....... 3624829
Aug. 14, 1986 [DE] Fed. Rep. of Germany ....... 3627566

[51] Int. Cl.$^4$ .......................... B60T 13/68; B60T 8/40
[52] U.S. Cl. .................................... 303/119; 303/116; 303/110
[58] Field of Search ................ 180/197; 303/6 R, 10, 303/11, 110, 111, 113, 114, 116, 117, 119

[56] References Cited

U.S. PATENT DOCUMENTS

| | | | |
|---|---|---|---|
| 3,482,887 | 12/1969 | Sheppard | 303/111 X |
| 4,484,280 | 11/1984 | Brugger et al. | 180/197 X |
| 4,578,951 | 4/1986 | Belart et al. | 303/119 X |
| 4,589,706 | 5/1986 | Leiber | 303/114 |
| 4,620,750 | 11/1986 | Leiber | 303/114 |
| 4,685,747 | 8/1987 | Belart et al. | 303/119 X |
| 4,687,260 | 8/1987 | Matsui et al. | 303/116 X |
| 4,715,663 | 12/1987 | Hattori et al. | 303/116 X |
| 4,750,783 | 6/1988 | Seibert et al. | 303/119 X |

FOREIGN PATENT DOCUMENTS

| | | |
|---|---|---|
| 3137287 | 1/1984 | Fed. Rep. of Germany . |
| 3327401 | 2/1985 | Fed. Rep. of Germany . |
| 3407539 | 9/1985 | Fed. Rep. of Germany . |
| 3438401 | 4/1986 | Fed. Rep. of Germany . |

*Primary Examiner*—Andres Kashnikow
*Assistant Examiner*—Timothy Newholm
*Attorney, Agent, or Firm*—James B. Raden

[57] ABSTRACT

A brake system for vehicles with electronic anti-lock control and traction slip control is equipped with a dual-circuit braking pressure generator (1) with preferably diagonal brake-circuit allotment. In the control phases, an auxiliary-pressure supply system (5), instead of the braking pressure generator (1), is hydraulically connected to the wheel brakes. Each brake circuit (I, II) contains, in the pressure-fluid conduits from the braking pressure generator to the wheel brakes, one joint multi-directional control valve (10, 11) and, connected in series thereto, individual wheel multi-directional control valves (12 to 15) which are likewise open in their inoperative position. In lieu of the braking pressure generator, the auxiliary-pressure supply system (5)—which generates pressure proportional to the pedal force during anti-lock control, while it generates uncontrolled pressure during traction slip control—is connected to the wheel brakes during the control phases. The point of connection is located in each case between the joint valves (10, 11) and the individual wheel multi-directional control valves (12 to 15).

8 Claims, 1 Drawing Sheet

U.S. Patent
Apr. 4, 1989
4,818,038
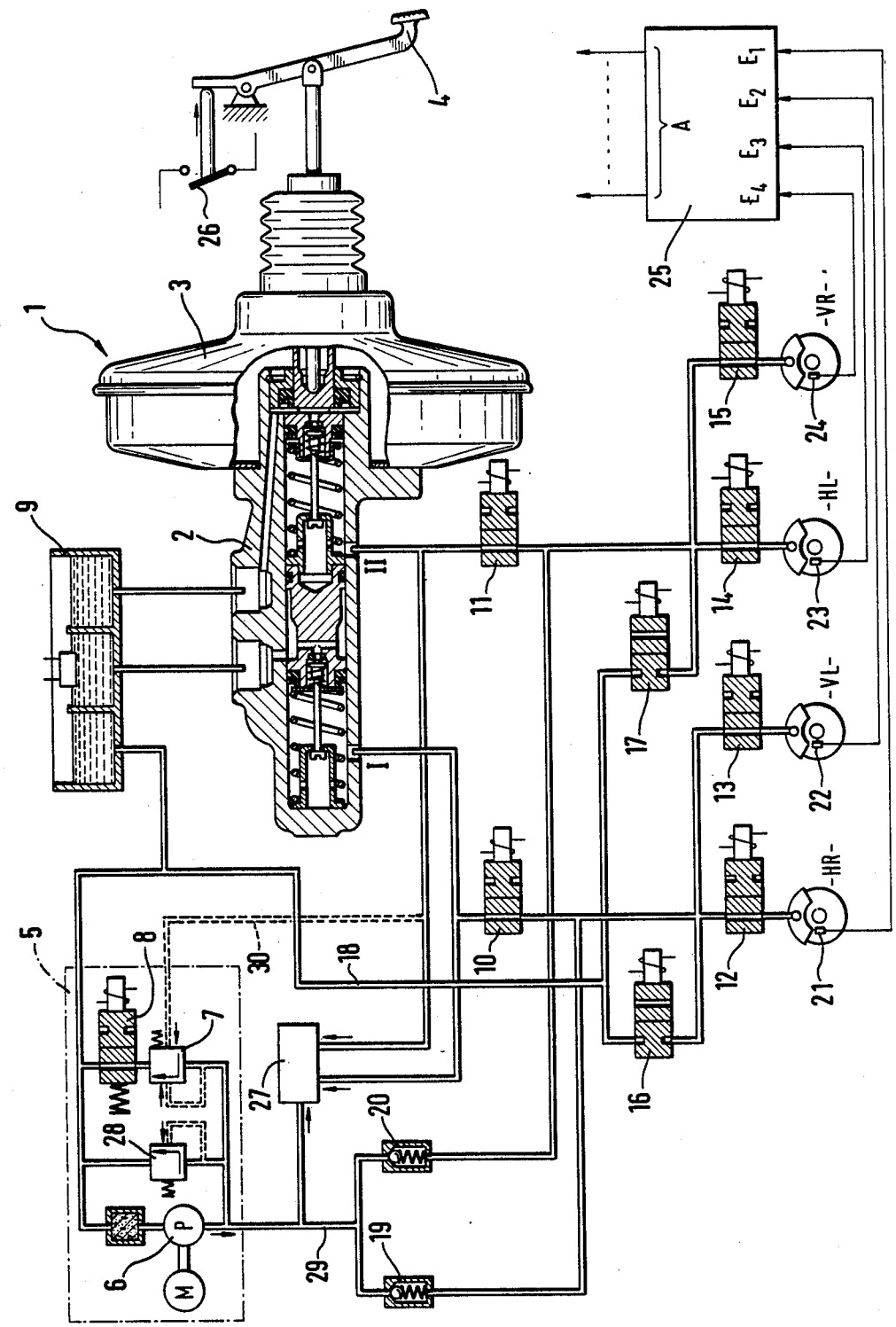

VEHICULAR BRAKE SYSTEM WITH ELECTRONIC ANTI-LOCK CONTROL AND TRACTION SLIP CONTROL

BACKGROUND OF THE INVENTION

The present invention relates to a brake system with electronic anti-lock control and traction slip control for use with vehicles, in particular for road vehicles. Such systems are equipped with a power-assisted dual-circuit braking pressure generator connected to hydraulic circuits which are connected to one front wheel and one rear wheel, in diagonal brake-circuit allotment and an auxiliary-pressure supply system which can be switched on during the control phases. On brake application, the auxiliary pressure supply system generates a controlled auxiliary pressure proportional to the pedal force and during traction slip control, generates an uncontrolled auxiliary pressure, limited by the pump output or by a pressure relief valve. Valves control the braking pressure in the wheel brakes and connect the braking pressure generator and/or the auxiliary-pressure supply system to the wheel brakes. Wheel sensors and electronic circuitries determine the wheel rotational behavior and generate electronic braking-pressure control signals.

One such proposed brake system publishes (patent application P No. 35 27 190) provides electronically controlled brake slip and traction slip in this manner. The braking pressure generator is a tandem master cylinder, connected upstream of which is a vacuum power brake booster and downstream of which are the two hydraulically isolated brake circuits with one front wheel and one rear wheel connected in diagonal allotment. Moreover, the system is provided with a hydraulic auxiliary-pressure supply system which generates a pedal-force-proportional auxiliary pressure for brake slip control and an uncontrolled auxiliary pressure for traction slip control. A relatively complicated valve assembly hydraulically isolates the braking pressure generator in the control phases and instead, connects the auxiliary-pressure supply system to the wheel brakes. The valve assembly includes an inlet valve/outlet valve pair which permits control of the braking pressure in one diagonal of each brake circuit. It further includes another inlet valve, i.e. a valve open in its inoperative position, in the connections leading to the non-driven wheels. Because of this additional valve, the coupling of the braking pressure variation in the two wheels connected to one hydraulic circuit is reduced or temporarily eliminated during the anti-lock control phase. Above all, this valve enables a traction slip control in such dual-circuit brake systems, because the pressure fluid conduit leading to the non-driven wheel can be interrupted and, thereby, only the driven wheel can be acted upon by braking pressure.

In other proposals concerning the design and the connection of such a valve assembly one started out from the consideration that the auxiliary pressure must be controlled by means of changeable multi-directional control valves in addition to the inlet valve/outlet valve pairs for the braking pressure control U.S. patent application Ser. No. 069,770.

SUMMARY OF THE INVENTION

It is an object of the present invention to reduce the expense of the valves in such brake systems and, nevertheless, achieve a largely independent control of the braking pressure variation in the individual wheel brakes during the anti-lock and traction slip control phases.

It has been found that this object can be achieved in a surprisingly straightforward manner by an improvement of the brake system initially referenced. One joint and one individual wheel multi-directional control valve which, in their inoperative positions, are open, i.e., switched to open-passage condition, are inserted in series into each of the pressure-fluid conduits from the braking pressure generator to the wheel brakes in each brake circuit. Connected between the joint and the individual wheel multi-directional control valves are a pressure-fluid return line and an auxiliary pressure supply line. The pressure fluid return line, via a multi-directional control valve closed in its inoperative position, leads to a pressure supply reservoir and the auxiliary-pressure supply line leads, via a non-return valve, to the auxiliary-pressure supply system.

Thus, the present invention requires only six simple wheel valves preferably designed as two-way/two-position directional control valves for connecting the wheel brakes to the dual-circuit braking pressure generator. Also required is but one inlet valve per brake circuit, which serves as a so-termed "separating valve" and which, on traction slip control, prevents the discharge of pressure fluid out of the auxiliary-pressure supply system into the unpressurized braking pressure generator. Beside the pressure control valve, the auxiliary-pressure supply system may contain another hydraulically or electromagnetically switchable shut-off valve for precluding the pressure fluid return flow to the suction side of the pump or to the reservoir and to enable a pressure build-up in the pump circuit during traction slip control.

According to a favorable embodiment of this invention, all valves incorporated are designed as electromagnetically actuatable two-way/two-position directional control valves.

The auxiliary-pressure supply system of the inventive brake system preferably can be activated by an anti-lock or traction slip control signal. However, it is also possible to design the circuitry such that the pump of the auxiliary pressure supply system will be put into operation on each brake application, or after a predetermined pedal force has been exceeded, or after a predefined advance motion of the pistons in the master cylinder, or in the presence of criteria derived therefrom.

Normally, one single auxiliary-pressure supply system is sufficient although, according to another embodiment of the instant invention, two supply systems, each of which is connected with one of the two brake circuits of the dual-circuit brake power booster could be incorporated into the system. This provides an increase to the independence of the braking pressure variation in both circuits and still improves the reliability of the system with respect to certain defects.

Another embodiment of this invention provides that in the braking-pressure reduction phase during an anti-lock or traction slip control action, the auxiliary-pressure supply system can be disabled, at least temporarily. "Temporarily" means during the entire reduction phase or, if desired, only at the commencement of the pressure reduction or for a predefined fixed period of time. If the auxiliary-pressure supply system is equipped with at least one electromotively driven hydraulic pump, it is arranged to switch off its drive motor during the pressure reduction phase, for either a short time or during the entire reduction phase.

In a known auxiliary-pressure supply system, the pressure side of the hydrualic pump and the pump suction side are hydraulically interconnected via a control valve which serves to generate the controlled pressure during the anti-lock control phase, and via a separating valve. The separating valve is open in its initial position and is switched over to close for generation of the uncontrolled pressure which is required in the traction slip control phase. By means of this separating valve which is most simply realizable by a two-way/two-position directional control valve, the braking pressure can be decreased in a simple and rapid fashion in the pressure reduction phase during a traction slip control action. In auxiliary-pressure supply systems which are not equipped with a like separating valve, such a valve may of course be inserted in addition.

BRIEF DESCRIPTION OF THE DRAWING

Further features, advantages and applications of the present invention can be gathered from the following description of a preferred embodiment taken in conjunction with the single FIGURE of the accompanying drawing which displays a simplified, partially schematic illustration of a brake system in accordance with this invention.

DETAILED DESCRIPTION OF A PREFERRED EMBODIMENT

As is shown in the drawing, the brake system comprises a braking pressure generator 1 which is composed of a tandem master cylinder 2 and a vacuum brake power booster 3 connected upstream thereof. A pedal 4 serves to actuate the braking pressure generator 1.

The brake system is also equipped with an auxiliary-pressure supply system 5 which comprises an electromotively driven hydraulic pump 6, a braking pressure control valve 7 and a separating valve 8. These two valves 7 and 8 are connected in series in the pressure-fluid circuit from the pressure side of the pump 6 to its suction side. Moreover, the pump suction side is connected to a pressure-compensating or pressure-fluid supply reservoir 9 which also delivers pressure fluid to the tandem master cylinder 2 in a conventional manner.

One front wheel and one rear wheel VL, HR are connected to brake circuit 1 and the other front wheel and rear wheel VR, HL are connected to brake circuit II.The allotment is diagonal. Inserted into the pressure-fluid conduit of each brake circuit I, II is a multi-directional control valve 10 and 11, respectively, which is open in its inoperative position and which is common to the two wheels on one diagonal. Also inserted in the pressure fluid conduit of each brake circuit I, II are further mutli-directional control valves 12, 13 and 14, 15, respectively. These further valves 12, 13, 14 and 15 are each associated with one wheel and each is also open in its inoperative position. Both wheels of one diagonal, that means VL, HR and VR, HL, respectively, are in communication with a return line 18 leading also to the pressure-compensating reservoir 9 via a joint outlet valve 16 and 17, respectively. The multidirectional control valve 16 is connected to valves 12 and 13 and a similar valve 17 is connected to valves 14 and 15. The outlet valves 16 and 17 are closed in their inoperative position.

The joint multi-directional control valve 10 and 11, respectively, and individual wheel multi-directional control valves 12, 13 and 14, 15, respectively, are thus connected in series.

Intermediate the joint multi-directional control valves 10 and 11, respectively, and the individual wheel mutli-directional control valves 12, 13 and 14, 15, respectively, the auxiliary-pressure supply system 5 is connected by one non-return valve 19, 20 and a supply line 29.

To generate the controlled auxiliary pressure which is proportional to the pressure in the working chambers of the master cylinder 2 and thus to the pedal force and which is supplied by the supply system 5, there is provided a pressure control port line 30 communicating with the brake circuit II.

A differential pressure switch 27 performs monitoring functions and provides an error signal. Switch 27 compares the pressures in the two brake circuits I, II one to the other and compares them with the auxiliary pressure.

Finally, each individual wheel is equipped with a wheel sensor 21 to 24, for instance an inductive transducer, which generates an electric signal proportional to the wheel rotational behavior and supplies this signal to an electronic controller 25. By means of hard-wired or programmed circuits in the interior of the controller 25, braking pressure control signals will then be generated in dependence on the sensed wheel rotational behavior and will be supplied via the outputs A in the shape of electric corrective signals to the individual electromagnetically actuatable valves 8 and 10 to 17 via non-illustrated electric lines. If desired, still further data can be evaluated in the controller 25 during the formation of the braking pressure control signals. For example, information about the brake actuation is supplied by a brake light switch 26. When the brake pedal 4 is released, this brake light switch signals, in each phase of the brake slip control, and instantaneously switches the multi-directional control valves 10 to 15 to thereby cause undelayed reduction of the braking pressure in the wheel brakes.

The mode of effect of the illustrated brake system is as follows:

During normal, that means uncontrolled, braking operations, all mutli-directional control valves remain in their inoperative position and thus in the switching position shown. Hence, the wheel brakes are connected via the valves directly to the braking pressure generator 1.

As soon as a wheel becomes unstable, anti-lock control will commence. The motor M of the hydraulic pump 6 is switched on, and auxiliary pressure will thereby develop in the supply system 5, the magnitude of which is dictated by the pressure in the brake circuit II. The separating valves 10, 11, will close and the auxiliary-pressure supply system 5 will take care of supplying the wheel brakes with pressure and will replenish that quantity of pressure fluid which is discharged through the outlet valves 16, 17 into the reservoir 9 during the phase of braking-pressure reduction, i.e., the phase when the outlet valves are open.

Since each wheel is connected via an inlet valve 12 to 15 of its own, temporary or pulsewise change-over of these valves allows the braking pressure to rise to the desired level and with the desired speed individually in each wheel. For the purpose of maintaining the pressure constant, the respective individual wheel inlet valve 12 to 15 is merely changed over to the closed position. A pressure reduction via the outlet valve 16 and 17, respectively, to which the wheel brakes of one diagonal are each connected can be limited to one single wheel by hydraulically isolating the second wheel of the brake circuit for the duration of the braking pressure reduction by change-over of the individual wheel valve. After the desired lower pressure level has been attained, if need be, continued pressure rise at this second wheel is caused by switching the assigned individual valve back and by change-over of the other individual valve of the same brake circuit. This type of deferred control is referred to as 'multiplex control'.

The pressure reduction can be assisted by switching off the auxiliary-pressure supply system 5, i.e, the drive motoro M of the hydraulic pump 6. The off-condition is either predefined invariably, or the motor M is de-activated for the entire duration or for a variable time within the pressure-reduction phase.

For traction slip control, the auxiliary pressure supply system 5 is switched on also; however, it will generate an uncontrolled pressure limited by the pump output or by the response of a pressure relief valve 28 because the pressure fluid flow through the control valve 7 is shut off completely by change-over (closing) of the valve 8. The joint multi-directional control valves 10, 11 of each vehicle diagonal are switched over in order to prevent the discharge of pressure fluid, i.e. the discharge of the auxiliary pressure via the master cylinder 2. Now, the braking pressure can be adjusted and varied individually for each wheel by means of the valves 12 to 17 in the same way as in anti-lock control.

The multi-directional control valve corrective signals, i.e. braking pressure control signals, are generated in the traction slip control phase, too, by evaluation of the data about the wheel rotational behavior which are obtained with the aid of the sensors 21 to 24. The electronic circuitries of the controller 25 likewise serve this purpose.

What is claimed is:

1. A brake system with electronic anti-lock control and traction slip control for automotive vehicles, said system comprising a power-assisted dual-circuit braking pressure generator, two circuits, each of which includes one front wheel and one rear wheel, connected to said braking pressure generator, at least one auxiliary-pressure supply system which is switched on during the control phases and which generates a controlled auxiliary pressure proportional to the pedal force during anti-lock control and an uncontrolled auxiliary pressure during traction control, said uncontrolled auxiliary pressure being limited by the pump output, valve means controlling the braking pressure in the wheel brakes and connecting the braking pressure generator and the auxiliary-pressure supply system to the wheel brakes, wheel sensors and electronic circuitries for determining the wheel rotational behavior and for generating electronic braking-pressure control signals, said valve means including one electromagnetically actuated two-way/two-position joint valve in each circuit and one electromagnetically actuated two-way/two-position individual wheel multi-directional control valve located in each of two parallel supply lines connecting the respective driven and non-driven wheels of each circuit to the joint valve of the circuit, said joint valves and said individual wheel valves, in their inoperative position, being open to permit passage of fluid therethrough, each joint valve being in series with the individual wheel valves in each circuit, a pressure-fluid return line and an auxiliary pressure supply line connected between the series connected joint valve of each circuit and the supply lines containing the individual wheel valves, a multi-directional control valve closed in its inoperative position located in each return line and leading to a pressure supply reservoir, and a non-return valve located in each auxiliary pressure supply line.

2. A brake system as claimed in claim 1, wherein the multi-directional control valves are provided as electromagnetically actuatable two-way/two-position directional control valves.

3. A brake system as claimed in claim 1 wherein the auxiliary-pressure supply system is activated by an anti-lock control signal or a traction slip control signal.

4. A brake system as claimed in claim 1 wherein the auxiliary-pressure supply system is put into operation on each brake application, and upon excess of a predetermined pedal force and predefined pedal travel, and in the presence of a criterion derived therefrom.

5. A brake system as claimed in claim 1 wherein the braking pressure generator comprises a master cylinder, and wherein the auxiliary-pressure supply system is activated upon excess of a predetermined advance motion of a piston in the master cylinder.

6. A brake system as claimed in claim 1 wherein the auxiliary-pressure supply system is de-activated, at least temporarily, in a phase of braking-pressure reduction during a slip control action.

7. A brake system as claimed in claim 6, wherein the auxiliary-pressure supply system includes at least one electric motor driven hydraulic pump, said motor being arranged to be switched off during the pressure-reduction phase.

8. A brake system as claimed in claim 7 wherein during a phase of braking-pressure deduction during a traction slip control action, the pressure side of the hydraulic pump is connected with the suction side of the pump by a multi-directional control valve which is switchable between its opened and closed condition.

* * * * *